US011106500B2

(12) United States Patent
Zhao et al.

(10) Patent No.: US 11,106,500 B2
(45) Date of Patent: Aug. 31, 2021

(54) MANAGING MEMORIES OF COMPUTING RESOURCES BASED ON DATA ACCESS SPEEDS

(71) Applicant: EMC IP Holding Company LLC, Hopkinton, MA (US)

(72) Inventors: Junping Zhao, Beijing (CN); Kun Wang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 248 days.

(21) Appl. No.: 16/397,820

(22) Filed: Apr. 29, 2019

(65) Prior Publication Data

US 2020/0233713 A1 Jul. 23, 2020

(30) Foreign Application Priority Data

Jan. 21, 2019 (CN) .......................... 201910053006.8

(51) Int. Cl.
*G06F 9/50* (2006.01)
(52) U.S. Cl.
CPC .......... *G06F 9/5016* (2013.01); *G06F 9/5083* (2013.01)
(58) Field of Classification Search
CPC .... G06F 9/5016; G06F 9/5083; G06F 9/5088; G06F 9/5011
See application file for complete search history.

(56) References Cited

U.S. PATENT DOCUMENTS

| | | | | |
|---|---|---|---|---|
| 8,996,837 | B1* | 3/2015 | Bono | G06F 3/0665 711/170 |
| 9,116,914 | B1* | 8/2015 | Muthirisavenugopal | G06F 16/185 |
| 9,513,968 | B1* | 12/2016 | Fiske | G06F 3/0685 |
| 9,703,664 | B1* | 7/2017 | Alshawabkeh | G06F 3/061 |
| 9,916,090 | B1* | 3/2018 | Can | G06F 3/0685 |
| 10,353,634 | B1* | 7/2019 | Greenwood | G06F 3/0619 |

(Continued)

OTHER PUBLICATIONS

Nvidia.com, "NVLink Fabric Multi-GPU Processing / NVIDIA Data Center," https://www.nvidia.com/en-us/data-center/nvlink/, downloaded Apr. 25, 2019, 2 pages.

(Continued)

*Primary Examiner* — Benjamin C Wu
(74) *Attorney, Agent, or Firm* — Ryan, Mason & Lewis, LLP

(57) ABSTRACT

A method, apparatus and computer program product for managing memories of computing resources is disclosed. In the method, a computing task processed by a first computing resource in a group of computing resources is determined. In response to a second memory of a second computing resource other than the first computing resource in the group of computing resources being allocated to the computing task, a second access speed with which the first computing resource accesses the second memory is determined. A target computing resource is selected from the group of computing resources based on an access speed with which the first computing resource accesses a target memory of the target computing resource, where the access speed is higher than the second access speed. At least one part of data in the second memory is migrated to the target memory.

20 Claims, 8 Drawing Sheets

(56) References Cited

U.S. PATENT DOCUMENTS

| | | | |
|---|---|---|---|
| 2015/0189019 A1* | 7/2015 | Wang | H04L 67/1097 |
| | | | 709/203 |
| 2015/0319245 A1* | 11/2015 | Nishihara | G06F 3/0647 |
| | | | 709/213 |
| 2017/0013046 A1* | 1/2017 | Flynn | H04L 67/06 |
| 2018/0150485 A1* | 5/2018 | Tripathy | G06F 16/1748 |
| 2018/0284997 A1* | 10/2018 | Dalmatov | G11C 16/349 |
| 2019/0310925 A1* | 10/2019 | Yoshida | G06F 3/0614 |

OTHER PUBLICATIONS

Developer.nvidia.com, "NVIDIA Collective Communications Library (NCCL)," https://developer.nvidia.com/nccl, May 10, 2017, 3 pages.
Devblogs.nvidia.com, "Unified Memory in CUDA 6," https://devblogs.nvidia.com/unified-memory-in-cuda-6/, Nov. 18, 2013, 8 pages.
J. Hubbard et al., "GPUs: HMM: Heterogeneous Memory Management," https://www.redhat.com/files/summit/session-assets/2017/S104078-hubbard.pdf, May 4, 2017, 26 pages.

* cited by examiner

MANAGING MEMORIES OF COMPUTING RESOURCES BASED ON DATA ACCESS SPEEDS

RELATED APPLICATION(S)

The present application claims priority to Chinese Patent Application No. 201910053006.8, filed Jan. 21, 2019, and entitled "Method, Apparatus, and Computer Program Product for Managing Memories of Computing Resources," which is incorporated by reference herein in its entirety.

FIELD

Implementations of the present disclosure generally relate to a computing system including dedicated computing resources, and more specifically, to a method, apparatus and computer program product for managing memories of dedicated computing resources.

BACKGROUND

With the development of computer technologies, there is an increasing variety of computing resources, and computing resources are no longer limited to traditional ones like central processing units. For example, currently the computing capability of graphic processing units (GPUs) has significantly increased. GPUs are particularly suitable to execute various types of computing tasks, such as machine learning, deep learning, data mining, high performance computing and so on by virtue of their distinctive properties.

There has been proposed a resource pool concept comprising dedicated computing resources, and different users may rent dedicated computing resources according to needs, so as to run respective applications. However, the capacity of memory of dedicated computing resources cannot be expanded without limit. At this point, when a dedicated computing resource is used to perform a computing task that requires greater storage space, the dedicated computing resource has to exchange data between its own memory (e.g., a memory of a GPU) and a slow external memory (e.g., a central processor of a device where the dedicated computing resource is located). The data exchange procedure will result in extra time and overhead, which reduces the efficiency of performing the computing task. Therefore, current research is focused on ways to manage memories of various computing resources so as to process a computing task with higher efficiency.

SUMMARY

Implementations of the present disclosure provide a method, apparatus and corresponding computer program product for managing memories of computing resources.

According to a first aspect of the present disclosure, there is provided a method for managing memories. The method comprises: determining a computing task processed by a first computing resource in a group of computing resources; in response to a second memory of a second computing resource other than the first computing resource in the group of computing resources being allocated to the computing task, determining a second access speed with which the first computing resource accesses the second memory; selecting a target computing resource from the group of computing resources based on an access speed with which the first computing resource accesses a target memory of the target computing resource, wherein the access speed is higher than the second access speed; and migrating at least one part of data in the second memory to the target memory.

According to a second aspect of the present disclosure, there is provided an apparatus for processing a computing task, comprising: at least one processor; a volatile memory; and a memory coupled to the at least one processor, the memory having instructions stored thereon, the instructions, when executed by the at least one processor, causes the apparatus to perform acts. The acts include: determining a computing task processed by a first computing resource in a group of computing resources; in response to a second memory of a second computing resource other than the first computing resource in the group of computing resources being allocated to the computing task, determining a second access speed with which the first computing resource accesses the second memory; selecting a target computing resource from the group of computing resources based on an access speed with which the first computing resource accesses a target memory of the target computing resource, wherein the access speed is higher than the second access speed; and migrating at least one part of data in the second memory to the target memory.

According to a third aspect of the present disclosure, there is provided a computer program product. The computer program product is tangibly stored on a computer readable medium and comprises machine executable instructions which, when executed, cause the machine to implement a method according to the first aspect.

The Summary is to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the following more detailed description of the example implementations of the present disclosure with reference to the accompanying drawings, the above and other objectives, features, and advantages of the present disclosure will become more apparent, wherein the same reference sign usually refers to the same component in the example implementations of the present disclosure.

DETAILED DESCRIPTION

The preferred implementations of the present disclosure will be described in more detail with reference to the drawings. Although the drawings illustrate the preferred implementations of the present disclosure, it should be appreciated that the present disclosure can be implemented in various manners and should not be limited to the implementations explained herein. On the contrary, the implementations are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example implementation" and "one implementation" are to be read as "at least one example implementation." The term "a further implementation" is to be read as "at least a further implementation." The terms "first," "second" and so on can refer to the same or different objects. The following text also can comprise other explicit and implicit definitions.

Dedicated computing resources can be provided locally at the client or by a remote machine or system. In some examples, a cloud-based computing system may be deployed, which includes a plurality of machines having one or more dedicated computing resources. The dedicated computing resources of the computing system can be utilized by different clients based on their needs to dispatch the corresponding applications to operate on available dedicated computing resources. For the sake of description, the dedicated computing resources are referred to as computing resources below.

Figure 1:
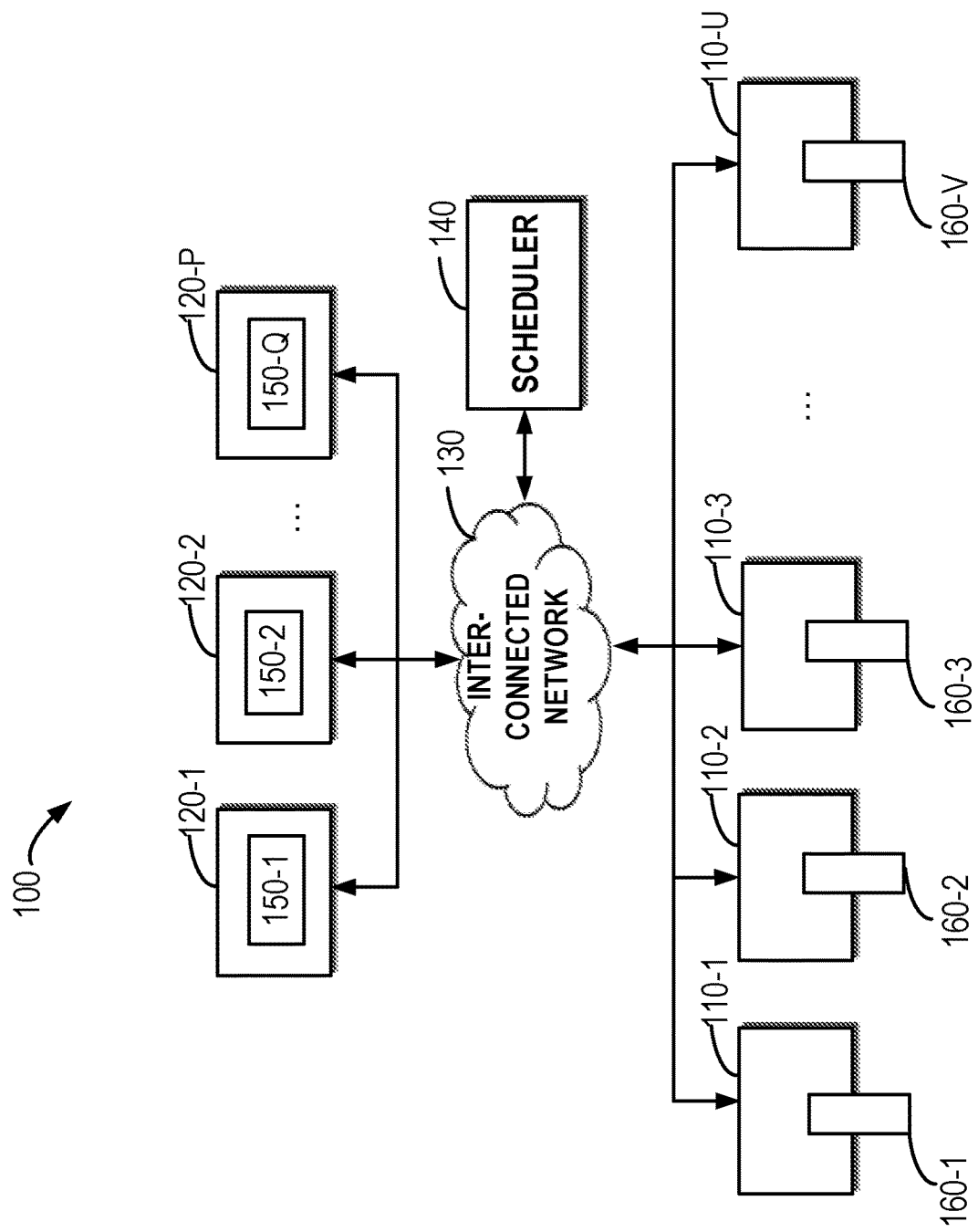
FIG. 1 schematically shows a block diagram of an example computing system in which implementations of the present disclosure can be implemented.

FIG. 1 is a schematic diagram illustrating an example computing system 100 in which implementations of the present disclosure can be implemented. A plurality of servers for running applications, including a server 110-1, a server 110-2, a server 110-3, . . . , a server 110-U (hereinafter collectively or individually referred to as a server 110, wherein U is a natural number greater than 1), are deployed in the computing system 100. The computing system 100 further includes a dedicated computing resource 160-1, a dedicated computing resource 160-2, a dedicated computing resource 160-3, . . . , a dedicated computing resource 160-V (hereinafter collectively or individually referred to as a dedicated computing resource 160, wherein V is a natural number greater than 1). Each server 110 has one or more dedicated computing resources 160.

In the example of FIG. 1, the server 110-1 has the dedicated computing resource 160-1, the server 110-2 has the dedicated computing resource 160-2, and the server 110-U has the dedicated computing resource 160-V. It will be understood that each server is not limited to have only one computing resource, but one server may have one or more computing resources. Therefore, here the value of U may not equal that of V. Examples of the dedicated computing resource 160 may include, but are not limited to, a Graphics Processing Unit (GPU), Field Programmable Gate Array (FPGA), or the like. For the sake of discussion, some implementations will take a GPU as the example of the dedicated computing resources. In addition to the dedicated computing resource 160, the server 110 may further include, for example, one or more general processing units such as a central processing unit (CPU) (not shown).

FIG. 1 further illustrates a plurality of clients 120-1, 120-2, . . . , 120-P (hereinafter collectively or individually referred to as a client 120, wherein P is a natural number greater than 1) respectively having applications 150-1, 150-2, . . . , 150-Q (hereinafter collectively or individually referred to as an application 150, wherein Q is a natural number greater than 1) to run. The application 150 may be any application running on the machine, and the application can be designed to perform corresponding data processing or analyzing tasks. As an example, the application 150 can perform data processing or analyzing tasks related to high performance computing (HPC), machine learning (ML) or deep learning (DL) and artificial intelligence (AI). It will be appreciated that each client is not limited to have only one application, but one client may have one or more applications. Therefore, here the value of P may not equal that of Q.

To quickly and efficiently run these applications and/or save local computing resources, the client 120 may request the dedicated computing resource 160 of the server 110 to run these applications 150. In such an implementation, the client 120 may be connected via an interconnected network 130 to one or more servers 110 and hand over the application 150 to run by one or more dedicated computing resources 160 of the server 110. The interconnected network 130 can support different types of wired or wireless connections based on various network transmission techniques, for example, remote direct memory access (RDMA), transmission control protocol (TCP) or the like, depending on interfaces supported by the client 120, the server 110 and/or the dedicated computing resource 160.

It should be understood that the device and/or arrangement as shown in FIG. 1 is provided as an example only. In other examples, the computing system 100 can include any suitable number of servers 110 and clients 120. Each server 110 can be mounted with any suitable number of dedicated computing resources 160 and each client 120 can have a plurality of applications 150 to run. In addition, a scheduler 140, although separately shown, can be implemented by other devices independent of the server 110 in the practical application, or can be implemented at least in part on one or more servers 110.

To describe in a clear and concise manner, example implementations of the present disclosure will be described in detail by mainly taking the GPU kernel as an example. It is known that a GPU, as a dedicated processor, has strong computing capability due to a large amount of kernels and high-bandwidth memory. In the GPU hardware architecture, one GPU usually has a large amount of GPU kernels, such as 5120 or up to 10000 kernels. The GPU kernel, as a dedicated computing resource, is the most basic processing unit, which is also known as a stream processor (SP). Instructions and tasks are eventually processed on the GPU kernel. A plurality of GPU kernels simultaneously execute the instructions to implement parallel computing of the GPU. A plurality of SPs, in addition to other resources such as register and shared memory, can compose one stream multiprocessor (SM).

However, it should be understood that a GPU is only an example dedicated computing resource, and shall not limit the scope of the present disclosure. Spirits and principles described herein can be applied to other dedicated computing resources, for example computing resources in an accelerator such as Field Programmable Gate Array (FPGA) currently known or to be developed in the future, without limiting to the GPU kernel only.

It will be understood various approaches have been proposed to process computing tasks by using the computing resources 160 in the resource pool. However, the capacity of a memory in the computing resource 160 is rather limited. When the memory capacity is insufficient to serve a computing task, data has to be exchanged between storage space (e.g., a memory of a central processor in the server 110) external to the computing resource 160 and the memory in the computing resource 160. This will lead to performance degradation of processing the computing task.

Figure 2A:
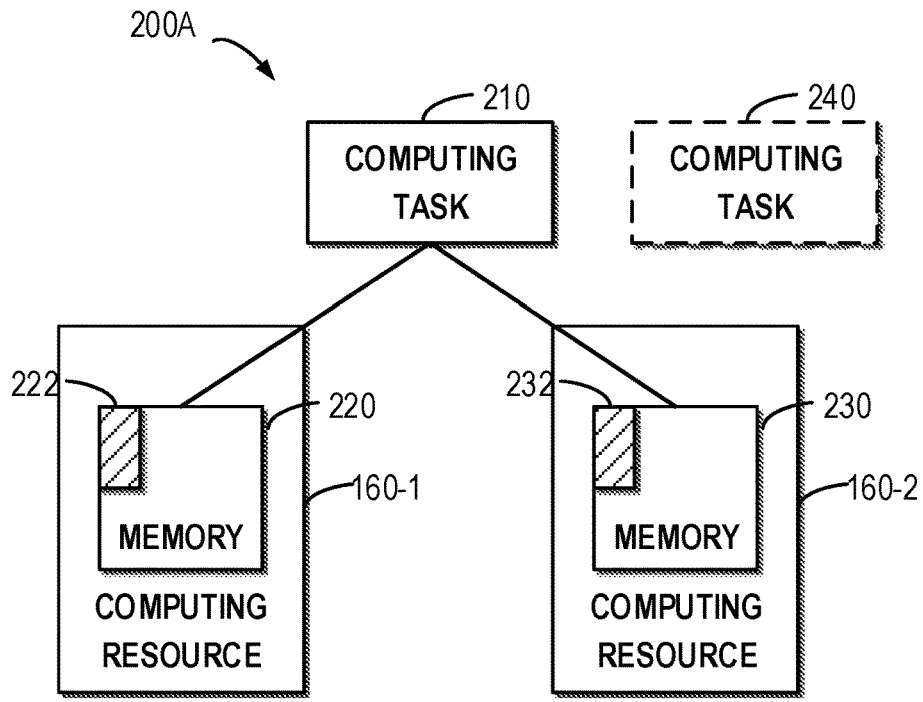
FIG. 2A schematically shows a block diagram of data distribution before data migration according to example implementations of the present disclosure.
Figure 2B:
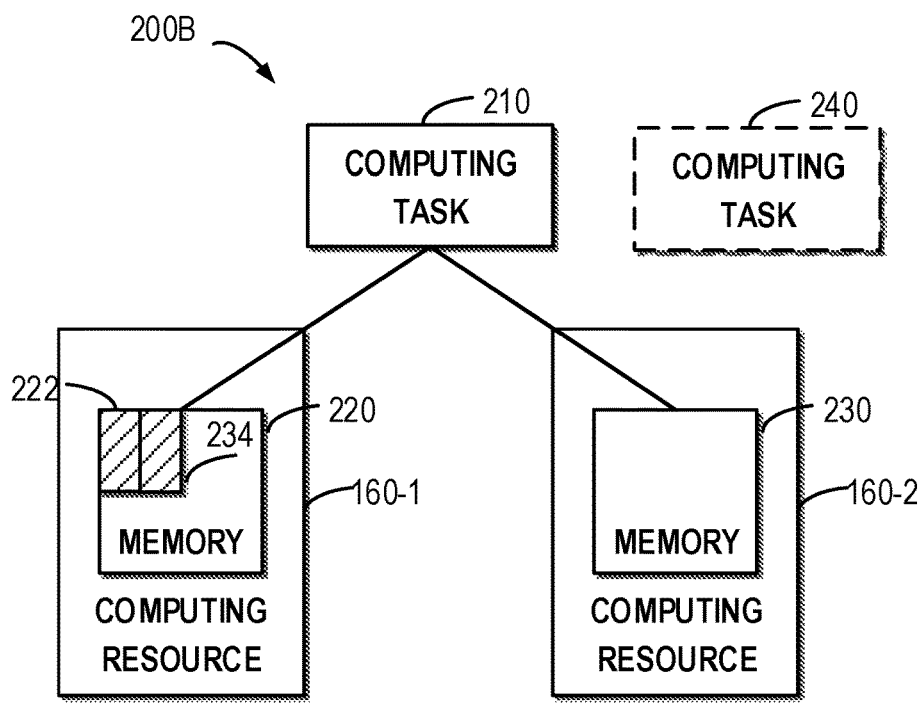
FIG. 2B schematically shows a block diagram of data distribution after data migration according to example implementations of the present disclosure.

In view of the drawbacks in the prior art, the present disclosure proposes a method for managing memories of computing resources. In the method, storage space may be allocated to a computing task across memories of multiple computing resources, and a memory may be re-allocated for serving the computing task while running the computing task. During the re-allocation, data that used to exist in a memory with a slow access speed may be migrated to a memory with a fast access speed. In this way, on the one hand, time for processing the computing task may be reduced, and on the other hand, the overall operating efficiency of multiple computing resources may be increased. With reference to FIGS. 2A and 2B, description is presented below on how to manage memories.

FIG. 2A schematically shows a block diagram 200A of data distribution before data migration according to example implementations of the present disclosure. As depicted, storage spaces 222 and 232 may be allocated in memories 220 and 230 of the computing resource 160-1 and the computing resource 160-2 respectively, so as to be used by a computing task 210. It may be specified that the computing task 210 is performed by the computing resource 160-1, and data associated with performing the computing task 210 may be stored and accessed across multiple memories 220 and 230. At this point, since the memory 220 is locally provided at the computing resource 160-1 and the memory is external to the computing resource 160-1, there is a big difference between access speeds with which the computing resource 160-1 accesses the two memories 220 and 230. It will be understood that although FIG. 2A shows the memories 220 and 230 are allocated to the computing task 210, the memory in the computing resource 160 may simultaneously serve multiple computing tasks, for example, it may serve computing tasks 210 and 240.

When it is determined there is an available space in the memory 220 of the computing resource 160-1, data in the storage space 232 may be migrated to the available space. FIG. 2B schematically shows a block diagram 200B of data distribution after data migration according to example implementations of the present disclosure. As depicted, when it is determined there is an available space in the memory 220, data that used to be in the storage space 232 in the memory 230 in FIG. 2A may be migrated to a storage space 234 (as shown in FIG. 2B in the memory 220 having a faster access speed). With the foregoing example implementation, data that used to be in an external memory (i.e., the memory external to the computing resource 160-1 that performs the computing task 210) having a slower access speed may be migrated to a local memory (i.e., the memory in the computing resource 160-1 that performs the computing task 210) having a faster access speed. In this way, the time duration of data transmission may be reduced, and the computing resource 160-1 is enabled to access data related to the computing task 210 with a faster speed while performing the computing task 210.

Figure 3:
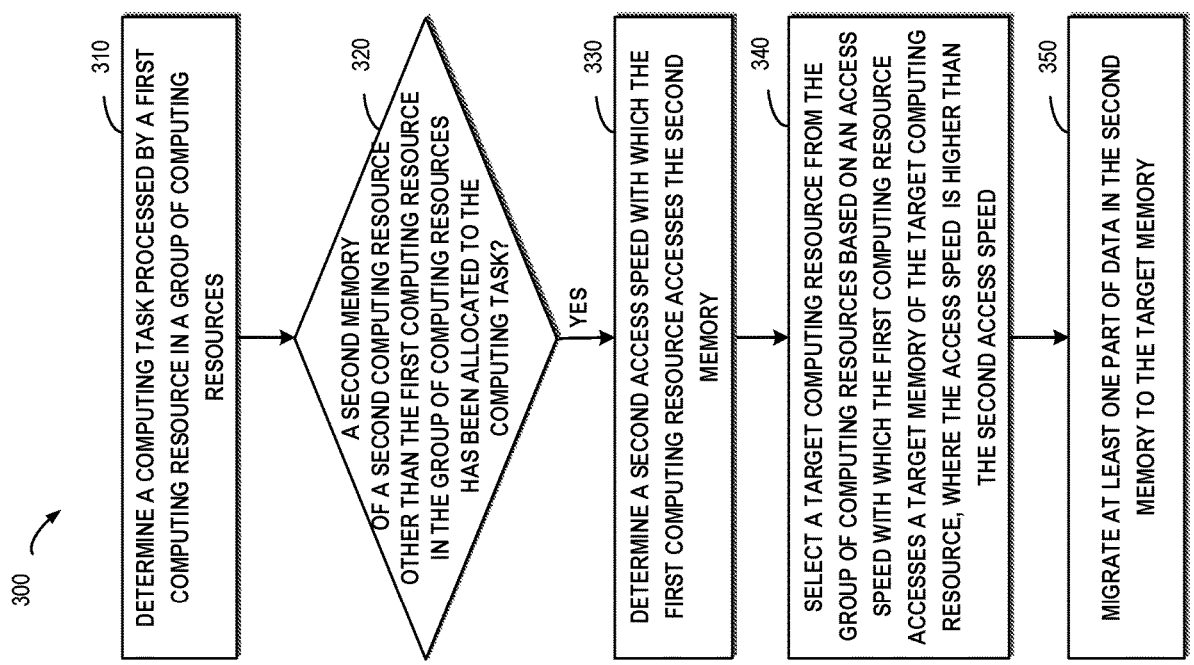
FIG. 3 schematically shows a flowchart of a method for managing memories of computing resources according to example implementations of the present disclosure.

According to example implementations of the present disclosure, there is provided a method for managing memories of the computing resources 160. Description is presented below to a flow of the method with reference to FIG. 3, which schematically shows a flowchart of a method 300 for managing memories of computing resources 160 according to example implementations of the present disclosure. As shown in FIG. 3, at block 310, the computing task 210 processed by a first computing resource 160-1 in a group of computing resources 160 is determined. According to example implementations of the present disclosure, the processing may be performed with respect to each computing resource in the group of computing resources 160 one by one. Alternatively and/or additionally, first a computing resource that helps to increase the processing efficiency of the computing task 210 running thereon may be selected as the first computing resource 160-1 from the group of computing resources 160.

According to example implementations of the present disclosure, first usage loads of memories of various computing resources in the group of computing resources 160 may be obtained. The various computing resources 160 are ranked based on the usage loads, and the first computing resource 160-1 is selected from the various ranked computing resources. In general, the lower the usage load of a memory in one of the computing resources 160, the more likely data in a memory of other computing resource 160 is migrated to the memory of this computing resource. Therefore, a computing resource with a lower usage load may be selected as the first computing resource 160-1.

By means of the foregoing example implementations of the present disclosure, data in a memory of another computing resource external to the computing resource 160-1 that operates the computing task 210 may be migrated to the memory 220 of the computing task 160-1 as far as possible. In this way, the access speed with which the computing task 210 accesses data in the memory may be accelerated, and further the processing performance may be improved.

Figure 4:
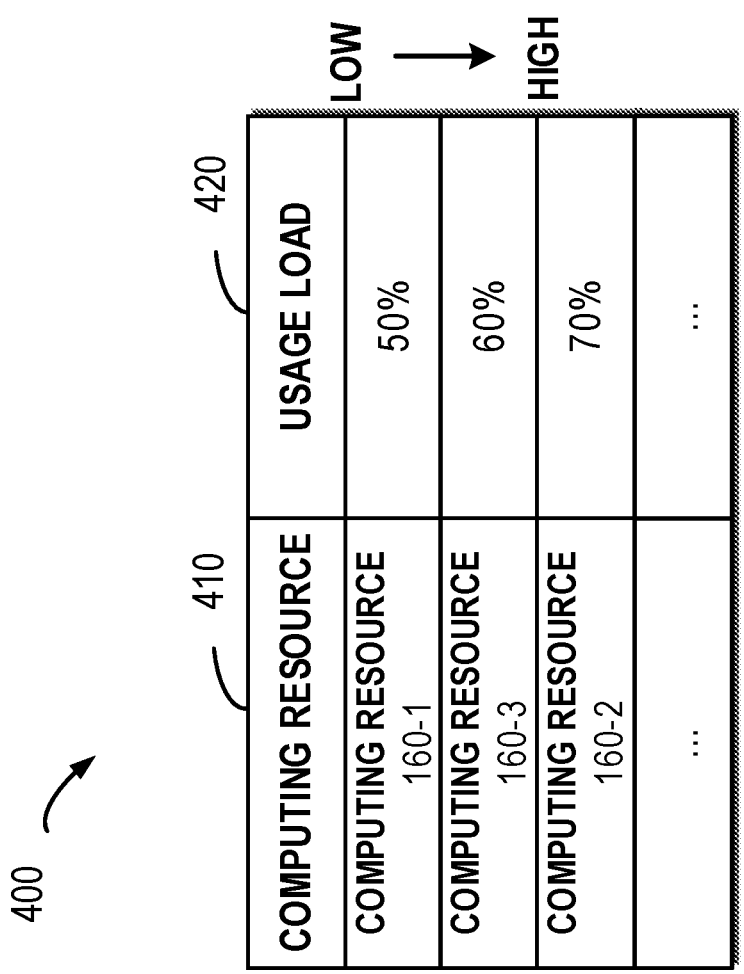
FIG. 4 schematically shows a block diagram of the ranking of usage loads of memories in multiple computing resources according to example implementations of the present disclosure.

With reference to FIG. 4, a detailed description is presented below as to how to select a first computing resource 160 from a group of computing resources 160 according to usage loads. FIG. 4 schematically shows a block diagram 400 of ranking usage loads of memories in multiple computing resources 160 according to example implementations of the present disclosure. As depicted, a column 410 represents identifiers of computing resources, and a column 420 represents usage loads of memories of computing resources. The multiple computing resources 160 may be ranked in increasing (or decreasing) order by usage loads. According to example implementations of the present disclosure, first a computing resource having a lower usage load may be selected. For example, the computing resource 160-1 may be selected.

It will be understood with the running of the computing system 100, that usage loads of memories of various computing resources 160 may change, and further, data migration may also change usage loads of memories of various computing resources 160. According to example implementations of the present disclosure, usage loads of memories of various computing resources in the group of computing resources 160 may be periodically monitored. Subsequently, the ranking of usage loads as shown in FIG. 4 may be constantly updated.

Figure 5:
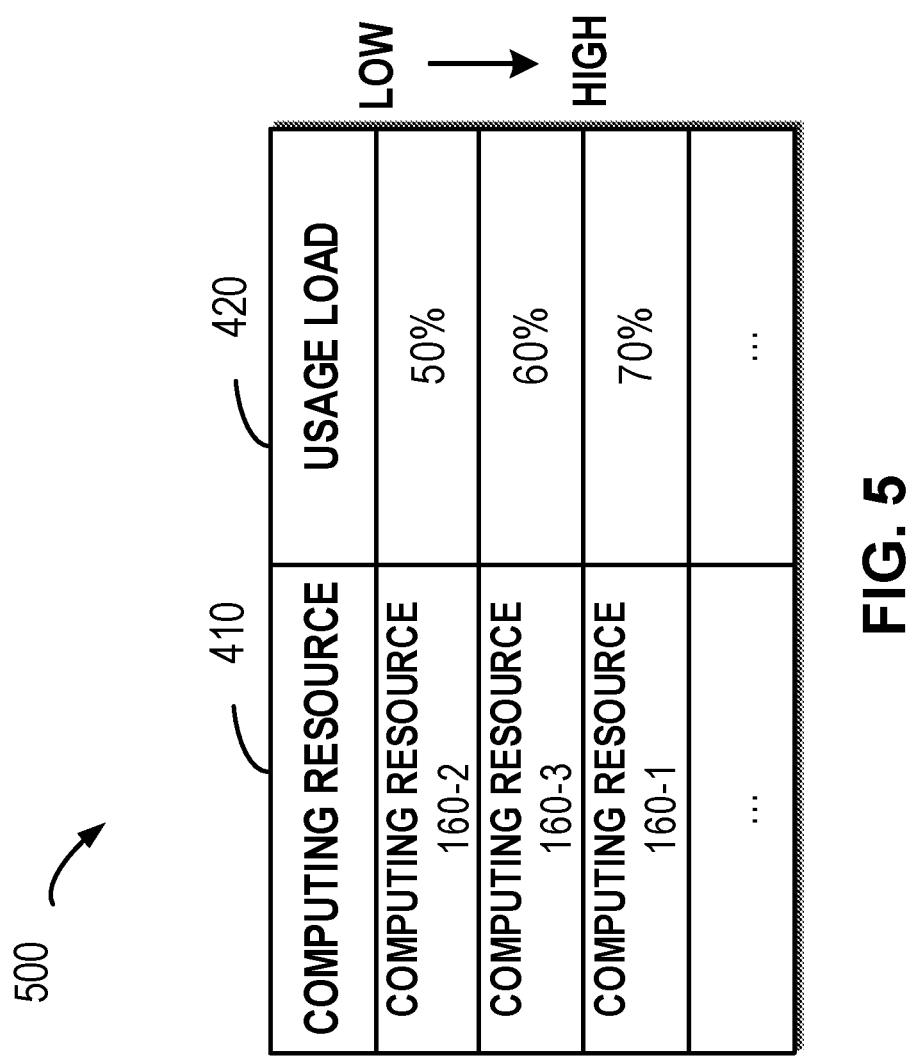
FIG. 5 schematically shows a block diagram of the ranking of usage loads of memories in multiple computing resources after data migration according to example implementations of the present disclosure.

Suppose part of data in a memory of a computing resource 160-2 is migrated to the computing resource 160-1, then the updated ranking is as shown in FIG. 5, which schematically shows a block diagram 500 of ranking of usage loads of memories in the multiple computing resources 160 after data migration according to example implementations of the present disclosure. As depicted, locations of the computing resources 160-2 and 160-1 change, and at this point the computing resource 160-2 becomes a to-be-processed computing resource. In this way, latest usage loads of memories of various computing resources may be determined in real time, and further a computing task running on a computing resource having the lowest usage load may be first processed.

According to example implementations of the present disclosure, the method 300 as shown in FIG. 3 may be triggered when it is determined a storage space in the memory 220 of a certain computing resource 160-1 in the group of computing resources 160 is released. Specifically, if it is detected that the size of the released storage space in the memory of the computing resource 160-1 in the group of computing resources 160 meets a predetermined condition, then the computing resource 160-1 is selected as the first computing resource 160-1. It will be understood releasing a storage space in a certain memory means the memory's usage load is reduced and the memory might provide space for data migration. Therefore, the method as shown in FIG. 3 may be triggered when a release operation is detected. At this point, the computing resource where the storage space is released may be selected as the first computing resource 160-1.

In general, the group of computing resources 160 will comprise a large number of memories 220 and 230, and release operations might be frequently performed in each of the memories 220 and 230. At this point, if the method 300 of the present disclosure is triggered after each release operation, then too frequent data migration might cause an extra burden to the operating efficiency of the group of computing resources 160. Therefore, according to example implementations of the present disclosure, the trigger condition may be limited using the size of the released space, and the method 300 of the present disclosure is triggered only when the size of the released space meets a predetermined condition. For example, a threshold (e.g., 500 M or other value) may be set, and a subsequent operation will be triggered only when the released space reaches 500 M. By means of the foregoing example implementations, too frequent data migration in the group of computing resources 160 may be avoided effectively, and further potential data migration that can barely help to improve the overall performance of the group of computing resources 160 and even reduce the performance may be avoided.

Returning to FIG. 3, at block 320, it may be determined whether a memory in the multiple computing resources 160 has been allocated to the computing task 210. In other words, besides the memory 220 in the first computing resource 160-1 being allocated to the computing task 210, it may be determined whether the second memory 230 in the second computing resource 160-2 other than the first computing resource 160-1 in the group of computing resources 160 is allocated to the computing task 210. It will be understood when a request for processing a specific computing task is received, a mapping table may be built to store a mapping relation between the computing task and a computing resource 160 where a memory allocated to the computing task is located. For example, the mapping relation may be stored in a data structure as shown in Table 1 below.

TABLE 1

Example of Mapping Relation Table

| No. | Computing Task | Memory |
|---|---|---|
| 1 | Computing task 210 | Memories of computing resources 160-1 and 160-2 |
| 2 | Computing task 240 | Memories of computing resources 160-1, 160-3 and 160-4 |
| ... | ... | ... |

As shown in the foregoing table, the second column "computing task" represents the identifier of a computing task, and the second column "memory" represents a memory/memories in which computing resource/resources is/are allocated to a computing task specified in the second column. As shown in Table 1, the second row represents memories in the computing resources 160-1 and 160-2 that are already allocated to the computing task 210, and the third row represents memories in the computing resources 160-1, 160-3 and 160-4 that are allocated to the computing task 240.

It will be understood that Table 1 simply illustrates an example of the mapping relation between various computing tasks and computing resources 160, and the mapping relation may further be stored using other data structure. For example, a column "processor" may be added to Table 1 so as to indicate a processor in which computing resource processes the computing task. At this point, the mapping relation may be stored using a data structure as shown in Table 2.

TABLE 2

Example of Mapping Relation Table

| No. | Computing Task | Processor | Memory |
|---|---|---|---|
| 1 | Computing task 210 | Processor of computing resource 160-1 | Memories of computing resources 160-1 and 160-2 |
| 2 | Computing task 240 | Processor of computing resource 160-1 | Memories of computing resources 160-1, 160-2 and 160-4 |
| ... | ... | ... | ... |

It will be understood multiple computing tasks might run in the first computing resource 160-1, at which point each computing task may be processed one by one. Further, regarding the computing task 210, in addition to the memory 220 in the first computing resource 160-1, memories in multiple computing resources may be allocated for processing the computing task 210. At this point, a memory in one of the multiple computing resources may be selected as the second memory.

According to example implementations of the present disclosure, first at least one memory among multiple memories in the group of computing resources 160 which has been allocated to the computing task may be determined. For example, it may be determined from the mapping table shown in Table 1 which memories have been allocated to the computing task 210. As shown in the second row of Table 2, suppose the computing task 210 runs on the computing resource 160-1, and the memories 220 and 230 of the computing resources 160-1 and 160-2 are allocated to the computing task 210. At this point, since only the memory 230 of the computing resource 160-2 is external to the computing resource 160-1, the memory 230 of the computing resource 160-2 may be directly selected as the second memory.

For another example, as shown in the third row of Table 2, suppose the computing task 240 runs on the computing resource 160-1, and memories of the computing resources 160-1, 160-2 and 160-4 are allocated to the computing task 240. At this point, since memories of both the computing resources 160-2 and 160-4 are external to the computing resource 160-1, the second memory may be selected from these two memories in various ways.

According to example implementations of the present disclosure, the second memory may be selected based on the size of a storage space allocated to the computing task 210 in the at least one memory. Continuing the foregoing example, it is desirable to select the second memory from memories of the computing resources 160-2 and 160-4. At this point, a memory to be selected may be determined according to sizes of storage spaces allocated to the computing task 240 in the memories of the computing resources 160-2 and 160-4. A memory in which less storage space is allocated may be selected. Suppose 1 G space in the memory of the computing resource 160-2 is allocated to the computing task 240, while 500 M space in the memory of the computing resource 160-4 is allocated to the computing task 240. Then, the memory of the computing resource 160-4 may be selected as the second memory, and 500 M data in the second memory are first migrated to a memory to which the processor of the computing resource 160-1 has a higher access speed.

According to example implementations of the present disclosure, the second memory may be selected based on a proportion of the size to a total amount of storage spaces allocated to the computing task 240. Continuing the foregoing example, it is desirable to select the second memory from memories of the computing resources 160-2 and 160-4. At this point, the memory to be selected may be determined according to respective sizes of storage spaces allocated to the computing task 240 in memories of the computing resources 160-2 and 160-4 and a total amount of storage spaces needed by the computing task 240. Suppose 1 G space in the memory of the computing resource 160-2 is allocated to the computing task 240, and 500 M space in the memory of the computing resource 160-4 is allocated to the computing task 240, while the total amount of storage spaces needed by the computing task 240 is 4 G. Then, the memory of the computing resource 160-4 may be used as the second memory, and 500 M data in the second memory is first migrated to a memory to which the processor of the computing resource 160-1 has a higher access speed. By means of the foregoing example implementations, data scattered in multiple external memories may be first concentrated to a certain memory or memories with a higher access speed, and further the processing performance of the computing task may be increased.

According to example implementations of the present disclosure, the second memory may be selected based on a usage load of the at least one memory. Continuing the foregoing example, it is desirable to select the second memory from memories of the computing resources 160-2 and 160-4. At this point, a memory from which data is migrated may be selected according to usage loads of memories of the computing resources 160-2 and 160-4. In general, the higher the usage load of a memory is, the lower the operating efficiency is. Therefore, a memory with a higher usage load may be selected from which data is migrated. Suppose a usage load of the memory of the computing resource 160-2 is 90%, while a usage load of the memory of the computing resource 160-4 is 80%. Then, the memory of the computing resource 160-2 may be selected as the second memory. By means of the foregoing example implementations, data may be migrated from the memory with a higher usage load. In this way, data may be migrated to the memory with a higher access speed and a lower usage load, so as to improve the performance of the computing task.

According to example implementations of the present disclosure, the second memory may be selected based on access frequency with which the at least one memory is accessed by the computing task. Continuing the foregoing example, it is desirable to select the second memory from memories of the computing resources 160-2 and 160-4. At this point, a memory from which data is migrated may be selected according to access frequencies of the computing task 240 to memories of the computing resources 160-2 and 160-4. In general, the higher the access frequency of a memory is, the higher the usage frequency of data stored therein is. At this point, it is hoped that data with higher usage frequency is migrated to a memory with a higher access speed, so as to improve the performance of the computing task 240. Suppose the access frequency of the memory of the computing resource 160-2 is 100 times/second, and the access frequency of the memory of the computing resource 160-4 is 200 times/second. Then the memory of the computing resource 160-4 may be used as the second memory. By means of the foregoing example implementations, data with higher access frequency may be migrated to a memory with a higher access speed, so as to improve the performance of the computing task.

It will be understood that various aspects for selecting the second memory have been shown schematically. Each of the aspects may be used separately or in combination with each other. For example, one or more of the aspects may be taken into comprehensive consideration when determining which memory is selected as the second memory. Alternatively and/or additionally, weights may be set to the aspects, and it may be determined by weighted summation which memory will be selected.

Still with reference to FIG. 3, if the judgment result at block 320 is yes, the method 300 proceeds to block 330 so as to determine a second access speed with which the first computing resource 160-1 accesses the second memory. It will be understood that since various computing resources 160 may use different types of connections between them, the access speed may be determined based on the connection type.

Figure 6A:
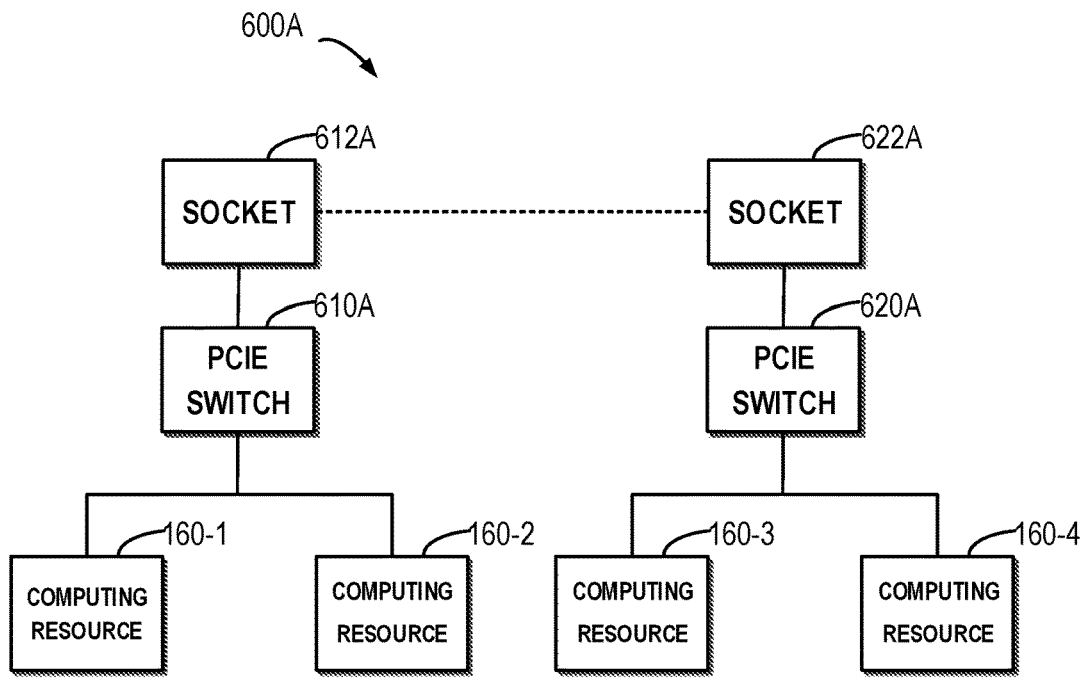
FIG. 6A schematically shows a block diagram of a topological structure of multiple computing resources according to example implementations of the present disclosure.
Figure 6B:
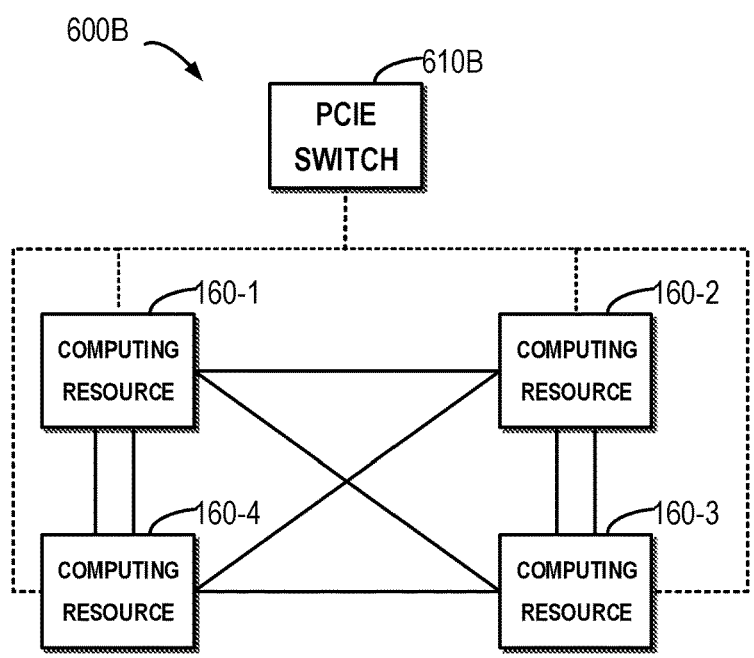
FIG. 6B schematically shows a block diagram of a topological structure of multiple computing resources according to example implementations of the present disclosure.

With reference to FIGS. 6A and 6B, two typical topological structures are illustrated below. FIG. 6A schematically shows a block diagram 600A of a topological structure of multiple computing resources 160 according to example implementations of the present disclosure. As depicted, a PCIe connection is established between the computing resources 160-1 and 160-2 based on a PCIe switch 610A, and a PCIe connection is established between the computing resources 160-3 and 160-4 based on a PCIe switch 620A. A quick path interconnection (QPI) connection is established between the PCIe switches 610A and 620A based on SOCKETs 612A and 622A.

FIG. 6B schematically shows a block diagram 600B of a topological structure of multiple computing resources according to example implementations of the present disclosure. As depicted, by taking GPU of NVIDIA as an example, between the computing resources 160-1, 160-2, 160-3 and 160-4 there is an NVlink connection as shown by solid lines, which supports 72 GB/s data transmission. Further, a PCIe-based connection as shown by dotted lines may further be established between the multiple computing resources 160 based on a PCIe switch 610B. In the implementations, relevant topological information may be collected from the topological structures as shown in FIGS. 6A and 6B. It will be understood FIGS. 6A and 6B merely illustrate two example topological structures. In other application environments, there may be comprised more or less computing resources 160, and these computing resources 160 may have further connection types.

Due to the difference in connection types, the access speed between two computing resources 160 at two ends of the connection also varies. FIGS. 6A and 6B schematically show bandwidths associated with different connections, and the access speed between two computing resources 160 may be determined based on the bandwidth in Table 3.

TABLE 3

Example of Connection Type

| No. | Connection Type | Annotation | Bandwidth |
|---|---|---|---|
| 1 | NVLink | Interconnection bus between GPUs | Optimal transmission bandwidth, amount to 36 GB/s |
| 2 | PCIe-S (also called as PIX) | Directly connect two GPUs with a single PCIe switch | Better transmission bandwidth, amount to 16 GB/s |
| 3 | PCIe-M | Indirectly connect two GPUs by multiple PCIe switches | Transmission bandwidth is lower than PCIe-S |
| 4 | PCIe-H (also called as PHB) | Bridge two GPUs by a PCIe host | Transmission bandwidth is lower than PCIe-M |
| 5 | QPI (also called as SOC) | Connection across SOCKET | Lower transmission bandwidth |
| ... ... | ... | ... | ... |

According to example implementations of the present disclosure, the second access speed with which the first computing resource accesses the second memory may be determined based on the topological structure between various computing resources 160 and according to the connection type shown in Table 3.

Returning to FIG. 3, at block 340, a target computing resource with a higher access speed may be selected from the group of computing resources 160 based on the access speeds. In other words, the access speed with which the first computing resource 160-1 accesses the target computing resource is higher than the second access speed. Here the target computing resource may be determined in various ways. It will be understood that the access speed with which the first computing resource 160-1 accesses its local memory will be higher than the access speed to other external memory. According to example implementations of the present disclosure, the first computing resource may be selected as the target computing resource. In other words, regarding the second memory external to the first computing resource, data in the second memory may be migrated to a local memory of the first computing resource. By means of the foregoing example implementations, it may be ensured that the first memory may access data needed during running with a higher speed.

According to example implementations of the present disclosure, first connection types between the first computing resource and various computing resources in the group of computing resources may be determined, and the target computing resource with a higher access speed may be selected according to the connection types and with reference to the bandwidths as shown in Table 3. Continuing the foregoing example, suppose the computing resources 160-1 to 160-4 are connected using the topological structure as shown in FIG. 6A, and the memories of the computing resources 160-1, 160-3 and 160-4 are allocated to the computing task 240. At this point, since the computing resource 160-1 and the computing resource 160-2 are directly connected via the PCIe switch 610A, and the computing resource 160-1 and the computing resource 160-4 are directly connected via the PCIe switch 610A, the SOCKET 612A and the SOCKET 622A, the computing resource 160-2 with a faster access speed may be selected as the target computing resource. Further, data in the memory of the computing resource 160-4 with a slower access speed may be migrated to the memory of the computing resource 160-2 with a faster access speed.

It will be understood that since data is concentrated to as less memories as possible so as to improve the performance of the computing task, data also will be migrated between various memories allocated to the computing task. According to example implementations of the present disclosure, at least one memory allocated to the computing task may be determined from the group of computing resources, and the target computing resource may be selected from a computing resource where a memory of the at least one memory resides. In this way, it may be ensured data related to the computing task will not be distributed in memories of multiple computing resources in a too scattered way. According to example implementations of the present disclosure, data may be migrated between various memories of the group of computing resources 160, so long as data is migrated to a memory with a higher access speed.

Returning to FIG. 3, at block 340, at least one part of the data in the second memory is migrated to the target memory. Specifically, first a storage space allocated to the computing task in the second memory may be determined, and data to be migrated may be selected from the determined storage space.

During data migration, there may arise various circumstances. According to example implementations of the present disclosure, the target memory might contain a vast available space, at which point all data in the determined storage space may be migrated to the target memory. Data migration may be performed in various ways, for example, using an application program interface (API) provided by a provider of the computing resource for managing memories. For example, if the computing resource is a GPU provided by NVIDIA Company, then data migration may be performed using function CUDA API cuMemAdvise and cuMemPrefetchAsync provided by NVIDIA Company.

According to example implementations of the present disclosure, a function for performing data migration may be written. For example, the function may specify a source address range where to-be-migrated data is and a destination address range for accommodating migrated data, so as to migrate data within the source address range to the destination address range. After migration, the state of a corresponding address range in each storage device may be updated. For example, the state of the source address range may be set as "available," and the state of the destination address range may be set as "used." According to example implementations of the present disclosure, the target memory might contain less available space, at which point part of data in the determined storage space may be migrated to the target memory.

Figure 7A:
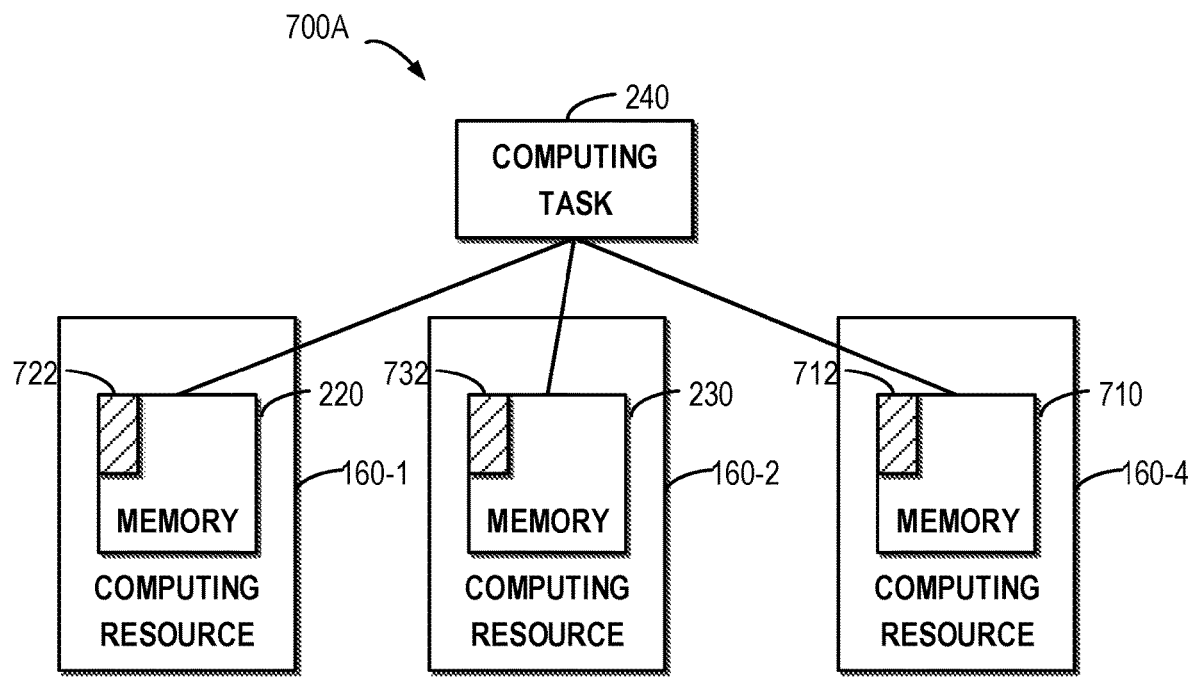
FIG. 7A schematically shows a block diagram of data distribution before data migration according to example implementations of the present disclosure.
Figure 7B:
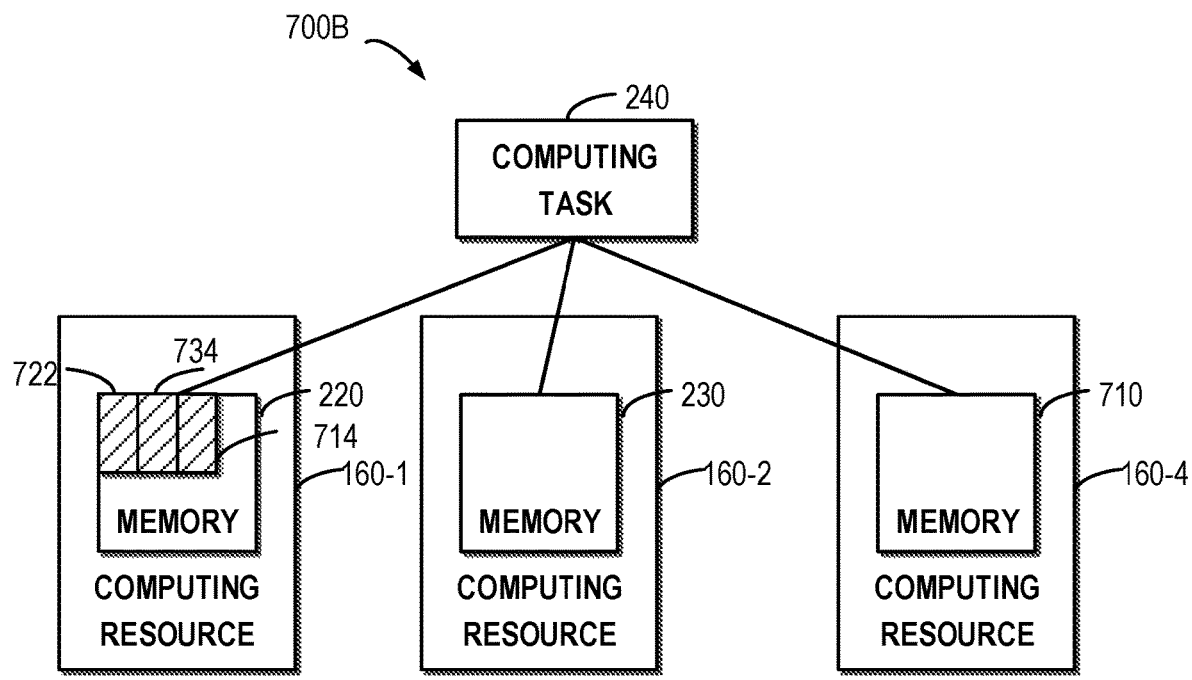
FIG. 7B schematically shows a block diagram of data distribution after data migration according to example implementations of the present disclosure.

Details about performing data migration once have been described. With reference to FIGS. 7A and 7B, description is presented below to the situation where data migration is performed several times between multiple memories. FIG. 7A schematically shows a block diagram 700A of data distribution before data migration according to example implementations of the present disclosure. As depicted, storage spaces in multiple memories of multiple computing resources have been allocated to the computing task 240: a storage space 722 in the memory 220 of the computing resource 160-1, a storage space 722 in the memory 220 of the computing resource 160-1, a storage space 732 in the memory 230 of the computing resource 160-2 and a storage space 712 in a memory 710 of the computing resource 160-4. At this point, the computing task 240 has to access data across memories of the multiple computing resources.

By the method described above, if it is determined that the memory 220 of the computing resource 160-1 contains a vast available space (e.g., the usage load of the computing resource 160-1 is the lowest among various computing resources), then data migration may be triggered. It will be understood that data migration may be performed twice according to the foregoing method. When the computing task 240 is run by the processor of the computing resource 160-1, the memory 220 is a local memory to the computing resource 160-1, and the memories 230 and 710 are external memories to the computing resource 160-1. At this point, data in the external memories 230 and 710 may be migrated to a memory with a faster access speed. When the local memory 220 contains sufficient available space, data in both the two external memories 230 and 710 may be migrated to the local memory.

FIG. 7B schematically shows a block diagram 700B of data distribution after data migration according to example implementations of the present disclosure. At this point, data that used to be in the storage space 732 in the memory 230 of the computing resource 160-2 in FIG. 7A may be migrated to a storage space 734 in the memory 220 of the computing resource 160-1 in FIG. 7B. Further, data that used to be in the storage space 712 in the memory 710 of the computing resource 160-3 in FIG. 7A may be migrated to a storage space 714 in the memory 220 of the computing resource 160-1 in FIG. 7B. After data migration, all data associated with the computing task 240 are stored to the local memory 220. In this way, the computing task 240 may access associated data with a much higher speed, and further the performance of the computing task 240 may be improved.

It will be understood although FIG. 7B illustrates the situation where the local memory 220 contains sufficient available spaces to accommodate all data associated with the computing task 240, when available spaces in the local memory 220 are insufficient to accommodate all data, a memory with a lower access speed may be selected from the memories 230 and 710 and data in the selected memory may be migrated.

Examples of the method according to the present disclosure have been described in detail with reference to FIGS. 2A to 7B. According to example implementations of the present disclosure, there is further provided an apparatus for managing memories of computing resources. The apparatus comprises: a task determining module configured to determine a computing task processed by a first computing resource in a group of computing resources; a speed determining module configured to, in response to a second memory of a second computing resource other than the first computing resource in the group of computing resources being allocated to the computing task, determine a second access speed with which the first computing resource accesses the second memory; a selecting module configured to select a target computing resource from the group of computing resources based on an access speed with which the first computing resource accesses a target memory of the target computing resource, wherein an access speed is higher than the second access speed; and a migrating module configured to migrate at least one part of data in the second memory to the target memory. (Block 350 of FIG. 3). The apparatus here may be configured to perform each step in the foregoing method, which is not detailed.

Figure 8:
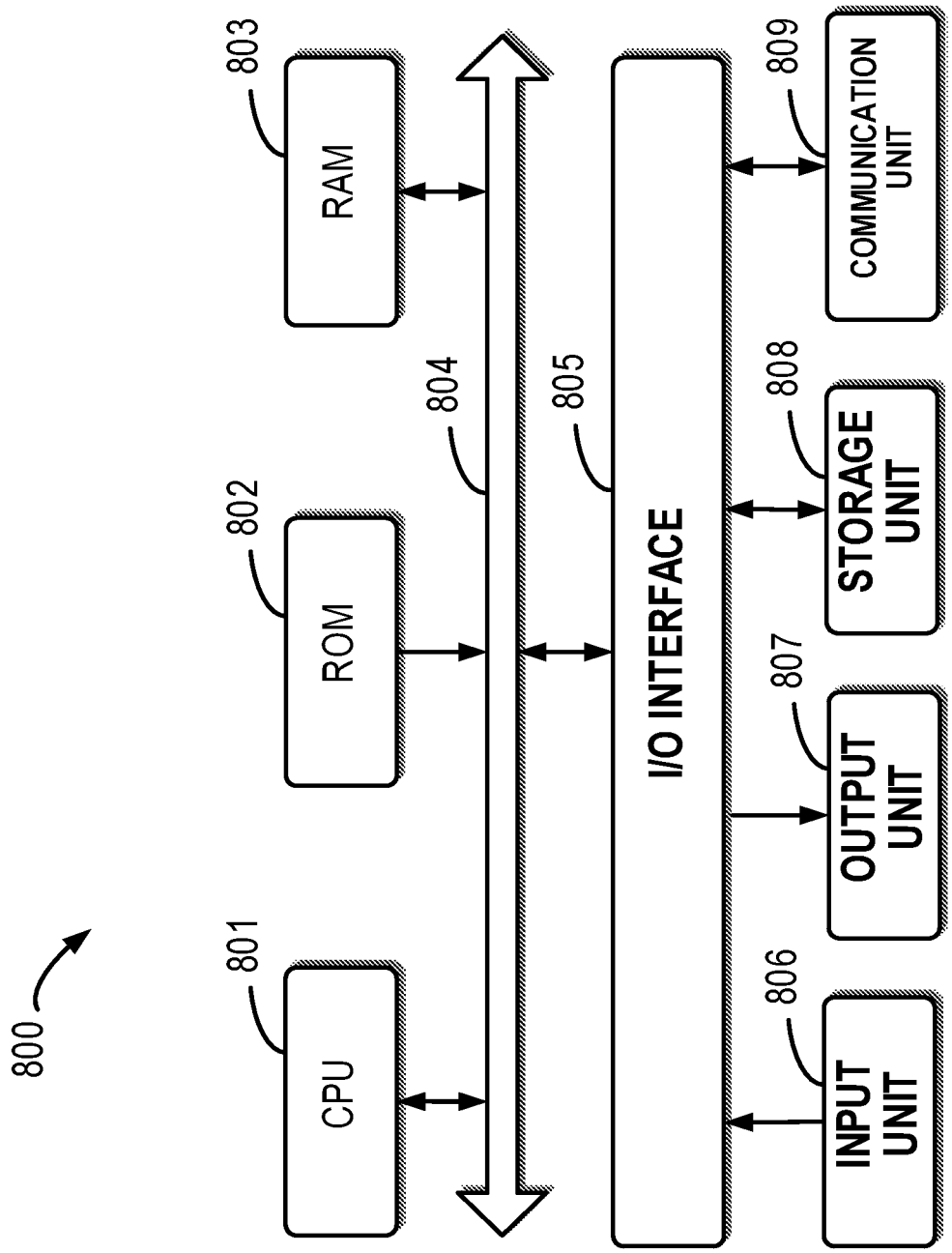
FIG. 8 schematically shows a block diagram of an apparatus for managing memories of computing resources according to example implementations of the present disclosure.

FIG. 8 schematically shows a block diagram of an apparatus for managing memories of computing resources according to example implementations of the present disclosure. As depicted, the apparatus 800 includes a central process unit (CPU) 801, which can execute various suitable actions and processing based on the computer program instructions stored in the read-only memory (ROM) 802 or computer program instructions loaded in the random-access memory (RAM) 803 from a storage unit 808. The RAM 803 can also store all kinds of programs and data required by the operations of the apparatus 800. CPU 801, ROM 802 and RAM 803 are connected to each other via a bus 804. The input/output (I/O) interface 805 is also connected to the bus 804.

A plurality of components in the apparatus 800 is connected to the I/O interface 805, including: an input unit 806, such as keyboard, mouse and the like; an output unit 807, e.g., various kinds of display and loudspeakers etc.; a storage unit 808, such as magnetic disk and optical disk etc.; and a communication unit 809, such as network card, modem, wireless transceiver and the like. The communication unit 809 allows the apparatus 800 to exchange information/data with other devices via the computer network, such as Internet, and/or various telecommunication networks.

The above described processes and methods, such as the method 300, can also be executed by the processing unit 801. For example, in some implementations, the method 300 can be implemented as a computer software program tangibly included in the machine-readable medium, e.g., the storage unit 808. In some implementations, the computer program can be partially or fully loaded and/or mounted to the apparatus 800 via ROM 802 and/or the communication unit 809. When the computer program is loaded to the RAM 803 and executed by the CPU 801, one or more steps of the above described method 300 can be implemented. Alternatively, in other implementations, the CPU 801 also can be configured in other suitable manners to realize the above procedure/method.

According to example implementations of the present disclosure, there is provided an apparatus for managing memories of computing resources, comprising: at least one processor; a volatile memory; and a memory coupled to the at least one processor, the memory having instructions stored thereon, the instructions, when executed by the at least one processor, causes the apparatus to perform acts. The acts include: determining a computing task processed by a first computing resource in a group of computing resources; in response to a second memory of a second computing resource other than the first computing resource in the group of computing resources being allocated to the computing task, determining a second access speed with which the first computing resource accesses the second memory; selecting a target computing resource from the group of computing resources based on an access speed with which the first computing resource accesses a target memory of the target computing resource, where the access speed is higher than the second access speed; and migrating at least one part of data in the second memory to the target memory.

According to example implementations of the present disclosure, the acts further comprise: obtaining usage loads of memories of various computing resources in the group of computing resources; and selecting the first computing resource from the group of computing resources based on the usage loads.

According to example implementations of the present disclosure, the acts further comprise: selecting a computing resource in the group of computing resources as the first computing resource in response to detecting that a size of a storage space in a released memory of the computing resource meets a predetermined condition.

According to example implementations of the present disclosure, the acts further comprise: determining at least one memory allocated to the computing task among memories of the group of computing resources.

According to example implementations of the present disclosure, the second memory is selected from the at least one memory based on at least one of: a size of a storage space allocated to the computing task in the at least one memory; a proportion of the size to a total amount of storage spaces allocated to the computing task; a usage load of the at least one memory; and access frequency with which the at least one memory is accessed by the computing task.

According to example implementations of the present disclosure, selecting the target computing resource comprises: selecting the first computing resource as the target computing resource.

According to example implementations of the present disclosure, selecting the target computing resource comprises: determining connection types between the first computing resource and various computing resources in the group of computing resources; and selecting the target computing resource based on the connection types.

According to example implementations of the present disclosure, selecting the target computing resource comprises: determining at least one memory allocated to the computing task in the group of computing resources; and selecting the target computing resource from a computing resource where a memory of the at least one memory resides.

According to example implementations of the present disclosure, migrating at least one part of data in the second memory to the target memory comprises: determining a storage space allocated to the computing task in the second memory; determining an available space in the target memory; and migrating data in the storage space to the available space in the target memory in response to the size of the storage space not being greater than the size of the available space.

According to example implementations of the present disclosure, migrating at least one part of data in the second memory to the target memory further comprises: migrating at least one part of data in the storage space to the available space in the target memory in response to the size of the storage space being greater than the size of the available space.

According to example implementations of the present disclosure, the acts further comprise: after migrating at least one part of data in the second memory to the target memory, updating the usage loads of memories of various computing resources in the group of computing resources.

According to example implementations of the present disclosure, there is provided a computer program product. The computer program product is tangibly stored on a computer readable medium and comprises machine executable instructions which, when executed, cause the machine to implement the method according to the present disclosure.

According to example implementations of the present disclosure, there is provided a computer readable medium. The computer readable medium is stored with machine executable instructions thereon, the machine executable instructions, when executed by at least one processor, causes the at least one processor to implement the method according to the present disclosure. The present disclosure can be method, device, system and/or computer program product. The computer program product can include a computer-readable storage medium, on which the computer-readable program instructions for executing various aspects of the present disclosure are loaded.

The computer-readable storage medium can be a tangible apparatus that maintains and stores instructions utilized by the instruction executing apparatuses. The computer-readable storage medium can be, but is not limited to, an electrical storage device, a magnetic storage device, an optical storage device, an electromagnetic storage device, a semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combinations of one or more programming languages, wherein the programming languages consist of object-oriented programming languages, e.g., Smalltalk, C++ and so on, and traditional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where a remote computer is involved, the remote computer can be connected to the user computer via any types of networks, including local area network (LAN) and wide area network (WAN), or to the external computer (e.g., connected via Internet using the Internet service provider). In some implementations, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Various aspects of the present disclosure are described here with reference to flow chart and/or block diagram of method, apparatus (system) and computer program products according to implementations of the present disclosure. It should be understood that each block of the flow chart and/or block diagram and the combination of various blocks in the flow chart and/or block diagram can be implemented by computer-readable program instructions.

The computer-readable program instructions can be provided to the processing unit of a general-purpose computer, dedicated computer or other programmable data processing apparatuses to manufacture a machine, such that the instructions when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions can also be loaded into a computer, other programmable data processing apparatuses or other devices, so as to execute a series of operation steps on the computer, the other programmable data processing apparatuses or the other devices to generate a computer-implemented procedure. Therefore, the instructions executed on the computer, the other programmable data processing apparatuses or the other devices implement functions/actions stipulated in one or more blocks of the flow chart and/or block diagram.

The flow chart and block diagram in the drawings illustrate system architecture, functions and operations that may be implemented by system, method and computer program product according to multiple implementations of the present disclosure. In this regard, each block in the flow chart or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various embodiments of the present disclosure have been described above, and the foregoing description is exemplary rather than exhaustive and is not limited to the disclosed embodiments. Numerous modifications and changes are obvious for those skilled in the art without departing from the scope of the invention. The selection of terms used herein is intended to best explain the principles, practical applications of each embodiment, or technical improvements of the techniques in the market so as to enable the various embodiments disclosed herein to be understood by those of ordinary skill in the art.

What is claimed is:

1. A method for managing memories of computing resources, the method comprising:
    selecting a computing resource in a group of computing resources as a first computing resource in response to detecting that a size of a storage space in a released portion of a first memory of the first computing resource exceeds a specified threshold, the first computing resource accessing the first memory at a first access speed;
    determining a computing task processed by the first computing resource;
    in response to a second memory of a second computing resource other than the first computing resource in the group of computing resources being allocated to the computing task, determining a second access speed with which the first computing resource accesses the second memory;
    selecting a target computing resource from the group of computing resources based on a target access speed with which the first computing resource accesses a target memory of the target computing resource, wherein the target access speed is greater than the second access speed; and
    migrating at least one part of data in the second memory to the target memory.

2. The method of claim 1, further comprising:
    obtaining usage loads of memories of various computing resources in the group of computing resources; and
    selecting the first computing resource from the group of computing resources based on the usage loads.

3. The method of claim 2, further comprising:
    after having migrated at least one part of data in the second memory to the target memory, updating the usage loads of memories of various computing resources in the group of computing resources.

4. The method of claim 1, further comprising:
 determining at least one memory allocated to the computing task among memories of the group of computing resources;
 selecting the second memory from the at least one memory based on at least one of:
  a size of a storage space allocated to the computing task in the at least one memory;
  a proportion of the size to a total amount of storage spaces allocated to the computing task;
  a usage load of the at least one memory; and
  access frequency with which the at least one memory is accessed by the computing task.

5. The method of claim 1, wherein selecting the target computing resource comprises: selecting the first computing resource as the target computing resource.

6. The method of claim 1, wherein selecting the target computing resource comprises:
 determining connection types between the first computing resource and various computing resources in the group of computing resources; and
 selecting the target computing resource based on the connection types.

7. The method of claim 1, wherein selecting the target computing resource comprises:
 determining at least one memory allocated to the computing task in the group of computing resources; and
 selecting the target computing resource from a computing resource where a memory of the at least one memory resides.

8. The method of claim 1, wherein migrating at least one part of data in the second memory to the target memory comprises:
 determining a storage space allocated to the computing task in the second memory;
 determining an available space in the target memory; and
 migrating data in the storage space to the available space in the target memory in response to a size of the storage space not being greater than a size of the available space.

9. The method of claim 8, wherein migrating at least one part of data in the second memory to the target memory further comprises:
 migrating at least one part of data in the storage space to the available space in the target memory in response to the size of the storage space being greater than the size of the available space.

10. An apparatus for managing memories of computing resources, comprising:
 at least one processor;
 a volatile memory; and
 a memory coupled to the at least one processor and having instructions stored thereon, the instructions, when executed by the at least one processor, causing the apparatus to perform steps comprising:
  selecting a computing resource in a group of computing resources as a first computing resource in response to detecting that a size of a storage space in a released portion of a first memory of the first computing resource exceeds a specified threshold, the first computing resource accessing the first memory at a first access speed;
  determining a computing task processed by the first computing resource;
  in response to a second memory of a second computing resource other than the first computing resource in the group of computing resources being allocated to the computing task, determining a second access speed with which the first computing resource accesses the second memory;
  selecting a target computing resource from the group of computing resources based on a target access speed with which the first computing resource accesses a target memory of the target computing resource, wherein the target access speed is greater than the second access speed; and
  migrating at least one part of data in the second memory to the target memory.

11. The apparatus of claim 10, wherein the steps further comprise:
 obtaining usage loads of memories of various computing resources in the group of computing resources; and
 selecting the first computing resource from the group of computing resources based on the usage loads.

12. The apparatus of claim 11, wherein the steps further comprise:
 after having migrated at least one part of data in the second memory to the target memory, updating the usage loads of memories of various computing resources in the group of computing resources.

13. The apparatus of claim 10, wherein the steps further comprise:
 determining at least one memory allocated to the computing task among memories of the group of computing resources;
 selecting the second memory from the at least one memory based on at least one of:
  a size of a storage space allocated to the computing task in the at least one memory;
  a proportion of the size to a total amount of storage spaces allocated to the computing task;
  a usage load of the at least one memory; and
  access frequency with which the at least one memory is accessed by the computing task.

14. The apparatus of claim 10, wherein selecting the target computing resource comprises: selecting the first computing resource as the target computing resource.

15. The apparatus of claim 10, wherein selecting the target computing resource comprises:
 determining connection types between the first computing resource and various computing resources in the group of computing resources; and
 selecting the target computing resource based on the connection types.

16. The apparatus of claim 10, wherein selecting the target computing resource comprises:
 determining at least one memory allocated to the computing task in the group of computing resources; and
 selecting the target computing resource from a computing resource where a memory of the at least one memory resides.

17. The apparatus of claim 10, wherein migrating at least one part of data in the second memory to the target memory comprises:
 determining a storage space allocated to the computing task in the second memory;
 determining an available space in the target memory; and
 performing one of:
  migrating data in the storage space to the available space in the target memory in response to a size of the storage space not being greater than a size of the available space; or
  migrating at least one part of data in the storage space to the available space in the target memory in response to the size of the storage space being greater than the size of the available space.

18. A computer program product, tangibly stored on a non-transitory computer readable medium and comprising machine executable instructions which, when executed, causes a machine to implement the steps of:
  selecting a computing resource in a group of computing resources as a first computing resource in response to detecting that a size of a storage space in a released portion of a first memory of the first computing resource exceeds a specified threshold, the first computing resource accessing the first memory at a first access speed;
  determining a computing task processed by the first computing resource;
  in response to a second memory of a second computing resource other than the first computing resource in the group of computing resources being allocated to the computing task, determining a second access speed with which the first computing resource accesses the second memory;
  selecting a target computing resource from the group of computing resources based on a target access speed with which the first computing resource accesses a target memory of the target computing resource, wherein the target access speed is greater than the second access speed; and
  migrating at least one part of data in the second memory to the target memory.

19. The computer program product of claim 18, wherein the steps further comprise:
  obtaining usage loads of memories of various computing resources in the group of computing resources; and
  selecting the first computing resource from the group of computing resources based on the usage loads.

20. The computer program product of claim 18, wherein selecting the target computing resource comprises: selecting the first computing resource as the target computing resource.

* * * * *